United States Patent Office 3,847,932
Patented Nov. 12, 1974

3,847,932
BENZIMIDAZOLE COMPOUNDS AND PESTICIDAL PREPARATIONS CONTAINING THEM
Stefan Janiak, Basel, and Otto Rohr, Therwil, Switzerland, assignors to Ciba-Geigy AG, Basel, Switzerland
No Drawing. Continuation-in-part of application Ser. No. 769,699, Oct. 22, 1968, now Patent No. 3,652,580, dated Mar. 28, 1972. This application Jan. 10, 1972, Ser. No. 216,782
Claims priority, application Switzerland, Oct. 26, 1967, 15,005/67
The term of this patent subsequent to Mar. 28, 1989, has been disclaimed
Int. Cl. C07d 49/38
U.S. Cl. 260—309.2                 4 Claims

ABSTRACT OF THE DISCLOSURE

The invention relates to benzimidazole derivatives of the general formula

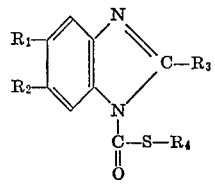

wherein $R_1$, and $R_2$ may be identical or different and each represents hydrogen, halogen, alkyl, alkoxy, alkylthio, —$NO_2$, —CN, or $CF_3$, $R_3$ represents hydrogen or an alkyl or cycloalkyl residue, and $R_4$ represents an alkyl, aralkyl or aromatic residue.

These new compounds are very effective as ingredients in biocidal preparations for plant-protection and combating fungi, insects, acarides, nematodes, endoparasites and microbes.

CROSS-REFERENCE

This application is a continuation-in-part of our application Ser. No. 769,699 filed Oct. 22, 1968, new U.S. Pat. No. 3,652,580.

The present invention provides compounds of the general formula

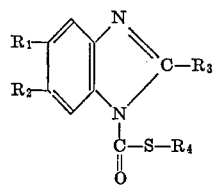

wherein $R_1$, and $R_2$ may be identical or different and each represents hydrogen, halogen, alkyl, alkoxy, alkylthio, —$NO_2$, —CN, or $CF_3$, $R_3$ represents hydrogen, or an alkyl or cycloalkyl residue, and $R_4$ represents an alkyl, aralkyl or aromatic residue.

The present invention also provides a pesticidal preparation which comprises, as active ingredient, at least one compound of the general formula I given above, together with a suitable carrier.

The preparation may contain one or more of the following additives: a solvent, a diluent, an emulsifier, a dispersing agent, a thickener, an adhesive as well as other known pesticides.

The active substances defined by formula I possess various interesting biocidal properties. They not only act as herbicides and defoliants, but at lower concentrations, at which no phytotoxic side effects arise, they show a strong lethal action on various representatives of the order acarina (ticks, spider mites and the like), insects and soil insects, their eggs and larvae, storage pests, for example cockroaches, snails and their eggs, nematodes, plant-pathogenic and human-pathogenic fungi, bacteria and viruses, animal-pathogenic and human pathogenic worms and spirochetes.

The symbol $R_3$ in the general formula of this invention is defined as hydrogen or an alkyl or cycloalkyl residue. The alkyl residue may be branched, straight chained and preferably represents a lower alkyl residue like methyl, ethyl, n-propyl, isopropyl, n-butyl, isobutyl, sec.butyl or tert.butyl. Perhalogenated aliphatic residues are excluded by this definition. Possible cycloalkyl residues are, for example, the cyclopropyl, cyclobutyl, cyclopentyl or cyclohexyl residue.

$R_4$ in the general formula in this invention is defined as an alkyl, aralkyl or aromatic residue; the aromatic residue, preferably phenyl, may be substituted in the most diverse manner, for example, by halogen atoms, or alkyl, alkoxy or alkylthio residues, or by the groups —$NO_2$, —CN, —$CF_3$ and the like. If $R_4$ is an alkyl residue, it preferably represents lower alkyl residues with 1 to 4 carbon atoms. The aralkyl residues are benzyl and phenylethyl which may be substituted in the phenyl ring.

The new compounds of this invention which are especially distinguished by their herbicidal and fungicidal and ovicidal action correspond to the formula

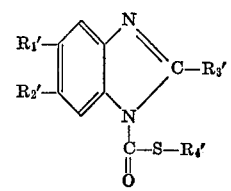

II wherein $R_1'$ is hydrogen or chlorine, a —$NO_2$, —$CH_3$ or —$CF_3$ group,
$R_2'$ is hydrogen or chlorine,
$R_3'$ is hydrogen, a lower alkyl group of 1 to 4 carbon atoms or the cyclopropyl residue,
$R_4'$ is a lower alkyl group with 1 to 4 carbon atoms, a phenyl ring that is unsubstituted or mono- or disubstituted by chlorine, methyl or —$NO_2$ or $R_4'$ is the benzyl radical.

Examples of such compounds are the following:

| R₁ | R₂ | R₃ | R₄ |
|---|---|---|---|
| H | H | H | C₆H₅ |
| H | H | H | C₆H₃Cl₂ (3,4) |
| H | H | H | C₆H₄CH₃ (m.) |
| H | H | H | CH₃ |
| H | H | H | C₂H₅ |
| H | H | H | C₃H₇ |
| H | H | CH₃ | CH₃ |
| H | H | CH₃ | C₂H₅ |
| H | H | CH₃ | C₃H₇ |
| Cl | H | H | C₆H₃Cl₂ (3,4) |
| Cl | H | H | C₆H₄CH₃ (m.) |
| Cl | H | H | C₂H₅ |
| Cl | H | H | C₃H₇ |
| Cl | H | CH₃ | C₆H₃Cl₂ (3,4) |
| Cl | H | CH₃ | C₆H₄CH₃ (m.) |
| Cl | H | CH₃ | C₂H₅ |
| Cl | H | CH₃ | C₃H₇ |
| NO₂ | H | H | C₆H₃Cl₂ (3,4) |
| NO₂ | H | H | C₆H₄CH₃ (m.) |
| NO₂ | H | H | C₂H₅ |
| NO₂ | H | H | C₃H₇ |
| NO₂ | H | CH₃ | C₆H₃Cl₂ (3,4) |
| NO₂ | H | CH₃ | C₆H₄CH₃ (m.) |
| NO₂ | H | CH₃ | C₂H₅ |
| CH₃ | H | H | C₆H₃Cl₂ (3, 4) |
| CH₃ | H | H | C₆H₄CH₃ (m.) |
| CH₃ | H | H | C₂H₅ |
| CH₃ | H | H | C₃H₇ |
| CH₃ | H | CH₃ | C₆H₃Cl₂ (3, 4) |
| CH₃ | H | CH₃ | C₆H₄CH₃ (m.) |
| CH₃ | H | CH₃ | C₂H₅ |
| CH₃ | H | CH₃ | C₃H₇ |
| CF₃ | H | H | C₆H₅ |
| CF₃ | H | H | C₆H₃Cl₂ (3, 4) |
| CF₃ | H | H | C₆H₄CH₃ (m.) |
| CF₃ | H | H | CH₃ |
| CF₃ | H | H | C₂H₅ |
| CF₃ | H | H | C₃H₇ |
| CF₃ | H | CH₃ | C₆H₅ |
| CF₃ | H | CH₃ | C₆H₃Cl₂ (3, 4) |
| CF₃ | H | CH₃ | C₆H₄CH₃ (m.) |
| CF₃ | H | CH₃ | C₂H₅ |
| CF₃ | H | CH₃ | C₃H₇ |
| H | H | Cyclopropyl | C₆H₅ |
| NO₂ | H | Cyclopropyl | C₆H₅ |
| CH₃ | H | Cyclopropyl | C₆H₅ |
| NO₂ | H | Cyclopropyl | CH₃ |
| CH₃ | H | Cyclopropyl | CH₃ |
| Cl | H | Cyclopropyl | C₆H₅ |
| Cl | H | Cyclopropyl | C₆H₃Cl₂ (3, 4) |
| Cl | H | Cyclopropyl | C₆H₄CH₃ (m.) |
| Cl | H | Cyclopropyl | C₂H₅ |
| Cl | H | Cyclopropyl | C₃H₇ (n.) |
| Cl | H | Cyclopropyl | C₃H₇ (i.) |
| Cl | H | Cyclopropyl | C₆H₄NO₂ (p.) |
| Cl | H | Cyclopropyl | C₄H₉ (n.) |
| Cl | H | Cyclopropyl | Benzyl |
| Cl | Cl | Cyclopropyl | CH₃ |
| Cl | Cl | Cyclopropyl | C₆H₅ |
| Cl | Cl | Cyclopropyl | Benzyl |

The active substances of formula I represent benzimidazolyl derivative of formula cording to the methods usual for the preparation of this class of substances.

As a rule, the procedure followed is to react a benzimidozolyl derivative of formula

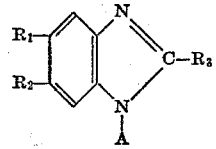

III with a compound of formula

BR₄  IV wherein A and B are groups which are able to form the grouping

whilst undergoing elimination or condensation.

In general, the procedure followed will be to react, in optional sequence, a reactive derivative of thiocarbonic acid with an imidazole of formula III (A=H) and an alcohol or phenol of formula IV (B=OH).

The procedure followed for the formation of urethanes is to react an imidazole of formula III with the desired chlorothiocarbonate.

The new preparations can be applied in many different forms, for example, in the form of sprays, dusting powders and granules. They can also be worked directly into the soil, optionally together with fertilisers.

Possible materials for the manufacture of directly sprayable solutions of the compounds of general formula I are, for example: mineral oil fractions of high to medium boiling range, for example, Diesel oil or kerosene, coal tar oil and oils of vegetable or animal origin, as well as hydrocarbons, for example, alkylated naphthalenes, or tetrahydronaphthalene, optionally using xylene mixtures, cyclohexanols, ketones, and furthermore chlorinated hydrocarbons, for example, trichlorethane and tetrachlorethane, trichlorethylene or trichlorobenzenes and tetrachlorobenzenes. It is advantageous to use organic solvents having boiling points above 100° C.

It is especially appropriate to prepare aqueous forms for application from emulsion concentrates, pastes or wettable spraying powder by adding water. Possible emulsifiers or dispersing agents are non-ionic products, for example, condensation products of aliphatic alcohols, amines or carboxylic acids having a long-chain hydrocarbon residue of about 10 to 20 carbon atoms with ethylene oxide, for example, the condensation product of octadecyl alcohol and 25 to 30 mols of ethylene oxide or that of soya fatty acid and 30 mols of ethylene oxide or that of technical oleylamine and 15 mols of ethylene oxide or that of dodecylmercaptan and 12 mols of ethylene oxide. Amongst the anionic emulsifiers which may be employed, there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids, or the sodium salt of a petroleum-sulphonic acid. Possible cationic dispersing agents that can be used are quaternary ammonium compounds, for example, cetylpyridinium bromide or dihydroxyethylbenzyldodecylammonium chloride.

In order to manufacture dusting and scattering agents, it is possible to use, as solid carriers: talc, kaolin, bentonite, calcium carbonate, calcium phosphate, also charcoal, cork powder, wood flour and other materials of vegetable origin. It is also advantageous to manufacture the preparations in a granular form. The various forms in which the preparations can be used may, in the usual manner, be provided with additions of substances which improve the distribution, adhesion, rain resistance or penetrating power; as such substances fatty acids, resin, glue, casein or alginates may be mentioned.

The preparations according to the invention may be employed by themselves or together with usual pesticides, especially insecticides, acaricides, nematocides, bactericides or further fungicides and/or herbicides.

The following Examples illustrate the invention:

EXAMPLE 1

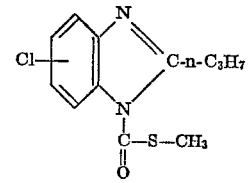

A mixture of 38.6 g. 2-n-propyl-5(6)-chloro-benzimidazole, 210 ml. of chloroform, 5 g. of MgO and 70 ml. of water is added into a 500 ml. sulfonation flask. The flask is then externally cooled and to the stirred content is added, dropwise, at a temperature range of 10 to 15° C. 23.2 g. of Methylthioformate. The reaction is slightly exothermic. When all the Methylthioformate is added, stirring is continued for 1¾ hours. The organic layer is then separated from the reaction mixture and dried over Na₂SO₄. Then the solvent is distilled off and a dark oil remains which becomes solid; m.p. 42 to 60°. Analysis: N calc. 10.2%. N found: 10.42% (compound No. 1).

According to this Example the following compounds were prepared:

| No. | R₁ | R₃ | R₄ | Melting point (° C.) |
|---|---|---|---|---|
| 2 | Cl | Cyclopropyl | C₆H₅ | Oil |
| 3 | H | H | C₆H₅ | 117–123 |
| 4 | H | H | CH₃ | 80–84 |

EXAMPLE 2

A 20% strength wetting powder is manufactured from compound No. 1 in the following manner:

20 g. of active substance are very finely ground in a pin mill together with 8 g. of fine precipitated silicon dioxide (commercially available under the name Zeosil) as well as with 64 g. of bolus alba, 5.6 g. of a condensation product of 1 mol of p-tert. octylphenol with about 8 mols of ethylene oxide and 2.4 g. of sodium 2-heptadecyl-1-benzylimidazole-di-sulphonate. The powder thus obtained can be worked up with water in any desired amount, to give stable dispersions.

EXAMPLE 3

Fungicidal activity against Erysiphe on *Cucumis sativa* plants

Young plants of *Cucumis sativus* were sprayed with suspensions containing 125, 250 and 500 p.p.m. of 5(6)-chloro-2-n-propyl-1-methyl thiocarbonyl-2-n-propyl-benzimidazole (compound No. 1). These suspensions were prepared from a wetting powder according to Example 2 by dilution with water. After this spray had dried, the plants were sprayed again with a suspension of spores of Erysiphe. The plants were then left 8 days in a greenhouse at 23° C. Then the degree infestation by the fungus was evaluated and compared with the infestation of untreated plants (control). The infestation with Erysiphe is given in percent leaf surface covered with a coating of mycelium.

| Compound | Concentration applied, p.p.m. | Percent leaf surface infested with mycelium |
|---|---|---|
| 5(6)-chloro-1-methylthiocarbonyl-2-n-propyl-benzimidazole | 125 | 0–5 |
|  | 250 | 0–5 |
|  | 500 | 0–5 |
| Control |  | 100 |

EXAMPLE 4

Fungicidal activity against *Erysiphe graminis* DC on wheat plants

Young wheat plants about 10 cm. high were sprayed in a greenhouse with suspensions containing 125, 250 and 500 p.p.m. of 5-chloro-1-methylthiocarbonyl-2-n-propyl-benzimidazole. These suspensions were prepared from a wetting powder according to Example 2 by dilution with water. After this spray has dried, the wheat plants were infested by rubbing conidia of the fungus against the wheat plants. The plants were left 12 days in the greenhouse at 20° C. and then the infestation of the wheat with *Erysiphe graminis* was determined.

| Compound tested | Concentration applied, p.p.m. | Percent wheat plants infested with *Erysiphe graminis* DC |
|---|---|---|
| 5(6)-chloro-1-methylthiocarbonyl-2-n-propyl-benzimidazole | 125 | 0–5 |
|  | 250 | 0–5 |
|  | 500 | 0–5 |
| Control |  | 100 |

We claim:

1. A benzimidazole compound of the formula

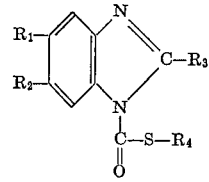

wherein R₁, and R₂ may be identical or different and are hydrogen, halogen, lower alkyl, nitro or trifluoromethyl, R₃ is hydrogen, lower alkyl or cycloalkyl of 3 to 6 carbon atoms, and R₄ is lower alkyl, phenyl, phenyl mono- or di-substituted by halogen, lower alkyl or nitro, or benzyl.

2. The benzimidazole compound according to claim 1: 1-phenylthiocarbonyl - 2 - cyclopropyl-5(6)-chlorobenzimidazole.

3. The benzimidazole compound according to claim 1: 1-phenylthiocarbonyl-benzimidazole.

4. The benzimidazole compound according to claim 1: 1-methylthiocarbonyl-benzimidazole.

References Cited

UNITED STATES PATENTS 3,652,580   3/1972   Janiak et al.   260—309.2

FOREIGN PATENTS 1,803,728   6/1968   Germany   260—309.2
1,503,580   10/1967   France   260—309.2

OTHER REFERENCES

Conant et al., The Chemistry of Organic Compounds 3rd ed., p. 342, Macmillan Co., New York 1947.

Hunter et al., J. Chem. Soc. (London) 1941, pp. 780–3 relied on.

Oddo et al., Gazz. Chim. Ital., Vol. 62, pp. 1092–1100 (1932).

Patchornik et al., J. Amer. Chem. Soc., Vol. 79, pp. 6416–20 (1957).

NATALIE TROUSOF, Primary Examiner

U.S. Cl. X.R.
71—72, 92; 424—273